「12」 United States Patent
Hsia et al.

(10) Patent No.: US 9,420,663 B1
(45) Date of Patent: Aug. 16, 2016

(54) LINEAR SOLID-STATE LIGHTING WITH AN ARC PREVENTION SWITCH MECHANISM FREE OF FIRE AND SHOCK HAZARDS

(71) Applicant: Aleddra Inc., Renton, WA (US)

(72) Inventors: Chungho Hsia, Bellevue, WA (US); Alan Lin, Shenzhen (CN); Cheri Qin, Shenzhen (CN)

(73) Assignee: ALEDDRA INC., Renton, WA (US)

( * ) Notice: Subject to any disclaimer, the term of this patent is extended or adjusted under 35 U.S.C. 154(b) by 0 days.

(21) Appl. No.: 14/818,041

(22) Filed: Aug. 4, 2015

Related U.S. Application Data

(63) Continuation-in-part of application No. 14/688,841, filed on Apr. 16, 2015, now Pat. No. 9,288,867.

(51) Int. Cl.
*H05B 37/02* (2006.01)
*H05B 33/08* (2006.01)
*F21K 99/00* (2016.01)
*F21V 25/12* (2006.01)
*F21Y 103/00* (2016.01)

(52) U.S. Cl.
CPC ............ *H05B 33/0887* (2013.01); *F21K 9/175* (2013.01); *F21V 25/12* (2013.01); *H05B 33/0809* (2013.01); *F21Y 2103/003* (2013.01)

(58) Field of Classification Search
None
See application file for complete search history.

(56) References Cited

U.S. PATENT DOCUMENTS

| | | | | |
|---|---|---|---|---|
| 2010/0029110 A1* | 2/2010 | Kiryu | ................. | H01R 13/7038 439/188 |
| 2011/0149563 A1* | 6/2011 | Hsia | ....................... | F21V 25/04 362/221 |
| 2011/0260622 A1* | 10/2011 | Hartikka | ................... | F21K 9/00 315/113 |
| 2012/0300445 A1* | 11/2012 | Chu | ........................ | F21V 25/04 362/217.13 |

\* cited by examiner

*Primary Examiner* — Douglas W Owens
*Assistant Examiner* — James H Cho
(74) *Attorney, Agent, or Firm* — Han IP Corporation

(57) ABSTRACT

A linear light-emitting diode (LED)-based solid-state universal lamp comprising integrated arc and shock prevention switches normally operates with either an electronic ballast or AC mains. When such a universal lamp is installed in or uninstalled from a linear tube lamp fixture, the integrated arc and shock prevention switches can work with an electronic ballast to prevent electric arc from occurring inside the lamp, thus eliminating any possible internal fire hazard while maintaining electric shock free for installers.

13 Claims, 6 Drawing Sheets

LINEAR SOLID-STATE LIGHTING WITH AN ARC PREVENTION SWITCH MECHANISM FREE OF FIRE AND SHOCK HAZARDS

CROSS-REFERENCE TO RELATED APPLICATIONS

This application is a continuation-in-part (CIP) application of U.S. patent application Ser. No. 14/688,841, filed Apr. 16, 2015 and currently pending. The above-identified application is incorporated herein by reference in its entirety.

BACKGROUND

1. Technical Field

The present disclosure relates to linear light-emitting diode (LED) lamps that operate with linear tube lamp fixtures configured to electrically connect to either an electronic ballast or AC mains, and more particularly to a universal, shock and fire hazard-free linear LED tube lamp with an arc and shock prevention mechanism.

2. Description of the Related Art

Solid-state lighting from semiconductor light-emitting diodes (LEDs) has received much attention in general lighting applications today. Because of its potential for more energy savings, better environmental protection (with no hazardous materials used), higher efficiency, smaller size, and longer lifetime than conventional incandescent bulbs and fluorescent tubes, the LED-based solid-state lighting will be a mainstream for general lighting in the near future. Meanwhile, as LED technologies develop with the drive for energy efficiency and clean technologies worldwide, more families and organizations will adopt LED lighting for their illumination applications. In this trend, the potential safety concerns such as risk of electric shock and fire become especially important and need to be well addressed.

In today's retrofit application of a linear LED tube (LLT) lamp to replace an existing fluorescent tube, consumers may choose either to adopt a ballast-compatible LLT lamp with an existing ballast used to operate the fluorescent tube or to employ an AC mains-operable LED lamp by removing/bypassing the ballast. Either application has its advantages and disadvantages. In the former case, although the ballast consumes extra power, it is straightforward to replace the fluorescent tube without rewiring, which consumers may have a first impression that it is the best alternative to fluorescent tube lamps. But the fact is that total cost of ownership for this approach is high regardless of very low initial cost. For example, the ballast-compatible LLT lamps work only with particular types of ballasts. If the existing ballast is not compatible with the ballast-compatible LLT lamp, the consumers will have to replace the ballast. Some facilities built long time ago incorporate different types of fixtures, which requires extensive labor for both identifying ballasts and replacing incompatible ones. Moreover, a ballast-compatible LLT lamp can operate longer than the ballast. When an old ballast fails, a new ballast will be needed to replace in order to keep the ballast-compatible LLT lamps working. Maintenance will be complicated, sometimes for lamps and sometimes for ballasts. The incurred cost will preponderate over the initial cost savings by changeover to the ballast-compatible LLT lamps for hundreds of fixtures throughout a facility. When the ballast in a fixture dies, all the ballast-compatible tube lamps in the fixture go out until the ballast is replaced. In addition, replacing a failed ballast requires a certified electrician. The labor costs and long-term maintenance costs will be unacceptable to end users. From energy saving point of view, a ballast constantly draws power, even when the ballast-compatible LLT lamps are dead or not installed. In this sense, any energy saved while using the ballast-compatible LLT lamps becomes meaningless with the constant energy use by the ballast. In the long run, ballast-compatible LLT lamps are more expensive and less efficient than self-sustaining AC mains-operable LLT lamps.

On the contrary, an AC mains-operable LLT lamp does not require a ballast to operate. Before use of an AC mains-operable LLT lamp, the ballast in a fixture must be removed or bypassed. Removing or bypassing the ballast does not require an electrician and can be replaced by end users. Each AC mains-operable LLT lamp is self-sustaining. If one AC mains-operable tube lamp in a fixture goes out, other lamps in the fixture are not affected. Once installed, the AC mains-operable LLT lamps will only need to be replaced after 50,000 hours. In view of above advantages and disadvantages of both ballast-compatible LLT lamps and AC mains-operable LLT lamps, it seems that market needs a most cost-effective solution by using a universal LLT lamp that can be used with the AC mains and is compatible with an electronic ballast so that LLT lamp users can save an initial cost by changeover to such a universal LLT lamp followed by retrofitting the lamp fixture to be used with the AC mains when the ballast dies.

Electronic ballasts have several different types. However in the US, instant-start electronic ballasts are most popular in lamp fixtures because they are more efficient and less expensive than other types of electronic ballasts and have few wires for installation. Nevertheless, it is better for the ballast-compatible LLT lamp to be compatible with either instant-start or rapid-start electronic ballasts. In the context hereafter, the instant-start electronic ballast will be referred to when a ballast is mentioned unless a rapid-start electronic ballast is explicitly stated.

In the U.S. patent application Ser. No. 14/688,841, filed Apr. 16, 2015, two shock prevention switches and an all-in-one driving circuit are adopted in an LLT lamp such that AC power from either an electronic ballast or the AC mains can operate the lamp without operational uncertainty and electric shock hazards. In other words, no matter what a lamp fixture is configured as the AC mains or an electronic ballast compatible fashion, the LLT lamp automatically detects configurations and works for either one. All of such LLT lamps, no matter whether AC mains-operable or ballast compatible, are electrically wired as double-ended and have one construction issue related to product safety and needed to be resolved prior to wide field deployment. This kind of LLT lamps always fails a safety test, which measures through lamp leakage current. Because an AC-mains voltage applies to both opposite ends of the tube when connected to a power source, the measurement of current leakage from one end to the other consistently results in a substantial current flow, which may present a risk of shock during re-lamping. Due to this potential shock risk to the person who replaces the LLT lamps in an existing fluorescent tube fixture, Underwriters Laboratories (UL) uses its standard, UL 935, Risk of Shock During Relamping (Through Lamp), to do a current leakage test and to determine if the LLT lamps meet the consumer safety requirement. Although the LLT lamps used with an electronic ballast can pass the current leakage test, some kinds of electric shock hazards do exist. Experimental results show that the skin of the person who touches an exposed bi-pin may be burned due to such an electric shock. Fortunately, a mechanism of double shock prevention switches used in applications with the AC mains is also effective in applications with the ballasts to prevent the electric shock from happening, thus protecting consumers from such a hazard, no matter whether input voltage is from the AC mains or the electronic ballast. Therefore, a universal LLT lamp that can work with either the AC mains or the electronic ballast makes sense. The effectiveness of using double shock prevention switches for applications in the AC mains has been well addressed in U.S. Pat. No. 8,147, 091, issued on Apr. 3, 2012. However, a conventional shock prevention switch has an inherent issue related to electric arc when operated with an electronic ballast. Unlike an AC voltage of 120 or 277 V/50-60 Hz from the AC mains, the output AC voltage and current from an electronic ballast presents a negative resistance characteristic. The feature that originally supports fluorescent tube to function properly becomes extremely detrimental to the conventional shock prevention switch due to electric arc likely occurring between two electrical contacts that have a high electrical potential difference with a high frequency, such as 600 V/50 kHz. Once a consumer fails to follow installation instructions to install or uninstall linear LED tube lamps such that one of two ends of the tube is in the fixture socket connected to a powered electronic ballast, and the other end is tweaked to connect to or disconnect from the associated socket, an internal arcing may occur between the electrical contacts in the associated switch. The arcing even in a short period such as several seconds can generate high heat, burning and melting electrical contacts and neighboring plastic enclosures, creating a fire hazard. The AC voltage of 120 or 277 V/50~60 Hz from the AC mains does not have such an issue because its voltage is relatively low compared with a ballast output voltage of 600 V. Moreover, the AC frequency of 60 Hz automatically extinguishes an arc every 1/60 seconds, if existed. That is why a utility switch can be used in an electrical appliance to turn power on and off without any problem. However when used with an electronic ballast, the electrical contacts used in the conventional shock prevention switch can easily be burned out due to a high-voltage and high-frequency arcing introduced between each gap of each pair of the electrical contacts in the conventional shock prevention switch when someone tries to abusively tweak to remove a tube lamp from a fixture with a ballast that has a power on it. Although such a situation is rare, an internal arcing and burning, if occurred, does cause burning and even welding of the electrical contacts and melting the plastic enclosure, so called internal fire, creating consumer safety issues. A conventional approach to suppress an arc in a switch is to use a snubber circuit comprising a capacitor and a resistor or a metal oxide varistor across each pair of switch contacts to supply a path for transient current. The approach, however, can only lessen the situation to a limited degree. Besides, the use of such electronic components results in an increase of leakage current, counteracting the effect of electric shock prevention. Furthermore, the electrical contacts in the conventional shock prevention switch continuously deteriorate due to contact surface material ionization and even arcing. Depending on how frequent a tube lamp is to be inserted into or removed from a fixture, the switch contact life is continuously shortened, whereas the metal oxide varistor or components used in the snubber circuit absorb part of the energy in transients during switch on and off and are heated up. The high temperature degrades the electronic components, creating a long-term reliability problem. Eventually, when the conventional shock prevention switches lose their functions, they can no longer protect a person from being electrically shocked during relamping. Consumerism is especially important today. It is therefore the purpose of this invention to disclose an arc prevention mechanism in each of shock prevention switches used in an LED tube lamp operating with an electronic ballast.

SUMMARY

A universal linear LED tube (LLT) lamp comprising a housing having two ends; an LED printed circuit board (PCB) with a plurality of LEDs connected as LED arrays; a lens; an LED driving circuit; and two input modules associated with the two ends, each comprising an integrated arc and shock prevention switch, is used to replace a fluorescent tube in a retrofit or newly-made linear tube lamp fixture that could have an existing electronic ballast or simply an AC mains-ready configuration. When such a universal LLT lamp is installed in or uninstalled from the fixture, the integrated arc and shock prevention switch can prevent electric arc from occurring inside, eliminating any possible internal fire hazard while maintaining electric shock free for consumers.

The integrated arc and shock prevention switch comprises two sets of electrical contacts each comprising two electrical contacts; an arc prevention mechanism comprising two arc extinguishers, made of an insulation material, each associated with a set of electrical contacts; a control mechanism used to effectively control the arc extinguishers to function, and a switch actuation mechanism. When the switch actuation mechanism is not actuated, each arc extinguisher is sandwiched in between the two electrical contacts in each set of electrical contacts not only to break up its own electrical connection but also to extinguish any arc possibly occurred across each set of electrical contacts. When the switch actuation mechanism is actuated, each arc extinguisher is rapidly pulled from the original position, leaving the two electrical contacts to touch each other and making an electrical connection. When the LLT lamp is installed in a fixture, the switch actuation mechanisms in the integrated arc and shock prevention switches are actuated so that four arc extinguishers are pulled away from their sandwiched position, in which each set of four sets of electrical contacts individually conducts to operate the LLT lamp. When someone tries to remove the LLT lamp from the fixture, she or he may not follow a standard procedure. In that case, she or he may just tweak the LLT lamp in a way that one end of the lamp is still in a powered fixture socket, and the other end is just about to be removed from the fixture. At the moment just before the exposed bi-pin is removed from the fixture socket, and when the switch actuation mechanism is accidentally deactivated, a load current cannot instantly jumps to zero because of inductive nature of the ballast used. A transient arc will be formed across the two sets of separating contacts of the shock prevention switch if no arc extinguisher is in place. The arc can cause damage to the lamp such as melting of conductors, destruction of insulation, and internal fire. In the worst case, an arc flash may occur, which produces luminous discharge and heat supplied with sufficient electrical energy to cause substantial damage, harm, fire, or injury to people and the lamp. Electrical arcs experience negative incremental resistance, which causes the electrical resistance to decrease as the arc temperature increases, resulting in a dangerously high temperature on the electrical contacts. This kind of hazards cannot be neglected. On the other hand, if integrated arc and shock prevention switches are used in the LLT lamp, at the moment just before a transient arc is formed across each set of separating contacts of the shock prevention switch, the arc extinguisher is pushed in between the separating contacts to instantaneously extinguish the arc. The high temperature or fire hazard can be prevented.

When such integrated arc and shock prevention switches are used on both ends of the universal LLT lamp, the switches can effectively block an electric current flowing through the LED driving circuit to an exposed bi-pin not yet installed in the fixture sockets, no matter whether the current is from the AC mains or a ballast. In other words, with such integrated arc and shock prevention switches on both ends of the universal LLT lamp, no line voltage or leakage current from the ballast will possibly appear at the exposed bi-pin and no electrical arcing will possibly occur for ballast applications during initial installation or re-lamping, thus completely eliminating risks of electric shocks and fire hazards.

Because double shock prevention switches are used in both ends of the lamp, consumers can safely install such a universal LLT lamp in an existing lamp fixture used to operate a conventional fluorescent tube without operational uncertainty and electric shock and fire hazards, no matter how the fixture is wired as with double-ended AC mains or an electronic ballast. The universal LLT lamp can immediately be used with an existing electronic ballast in a fixture without rewiring. When the ballast dies, consumers may choose to replace it with a new one at cost or just to bypass it and to electrically connect the fixture as an AC mains-operable one. In the latter case, the consumers can just install the universal LLT lamp back into the fixture without worrying about possible electric shock hazard that may occur when they accidentally touch an exposed bi-pin on the other end of the lamp.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified.

DETAILED DESCRIPTION OF VARIOUS EMBODIMENTS

Figure 1:
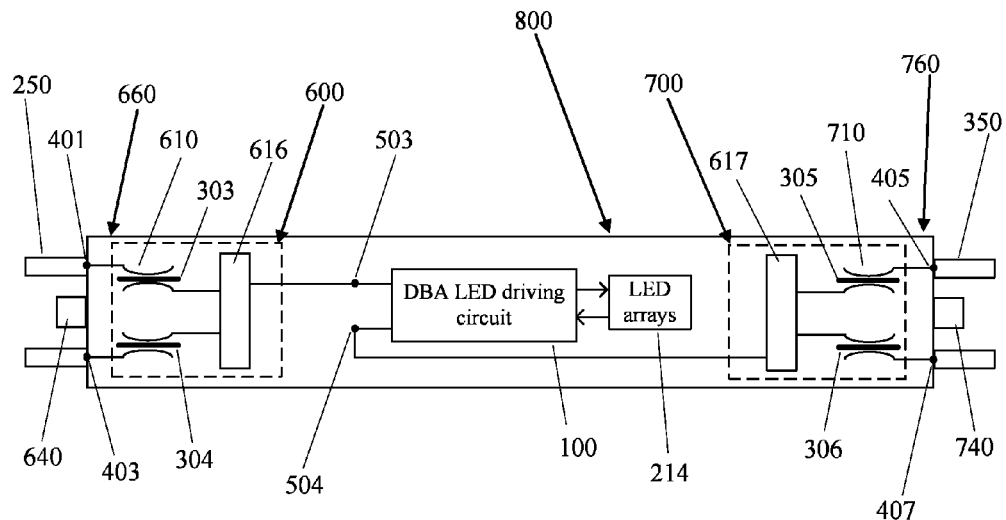
FIG. 1 is a block diagram of a universal LLT lamp operable with either the AC mains or an electronic ballast, in which integrated arc and shock prevention switches are used according to the present disclosure.

FIG. 1 is a block diagram of a universal LLT lamp operable with an external power supply (e.g., either the AC mains or an electronic ballast), in which integrated arc and shock prevention switches are used according to the present disclosure. The universal LLT lamp 800 comprises a housing having two ends; two lamp bases 660 and 760 having respective bi-pins 250 and 350 at each end of the housing; a first and a second input modules 600 and 700 respectively comprising integrated arc and shock prevention switches 610 and 710 and filament circuits 616 and 617; two actuation mechanisms 640 and 740 of the integrated arc and shock prevention switches 610 and 710 respectively in the two lamp bases 660 and 760; a double-ended ballast and AC mains ready (DBA) LED driving circuit 100 having two input/outputs 503 and 504; and LED arrays 214 on an LED PCB. Each of the filament circuits 616 and 617, comprising at least a resistor, has three ports in which the first and the second ports connect to the two pins of the respective bi-pins 250 and 350 through the integrated arc and shock prevention switches 610 and 710, and the third port connects to the input/output ports 503 and 504. The DBA LED driving circuit 100 thus can receive power from the bi-pins 250 and 350 connected to the AC mains or the electronic ballast in a double-ended wiring lamp fixture.

The integrated arc and shock prevention switch 610 in the first input module 600 at the lamp base 660 is of double-pole single-throw type, which comprises one actuation mechanism 640 and two sets of electrical contacts. In the first set, the first electrical contact connects to the upper pin of the bi-pin 250 at an electrical contact 401 whereas the second electrical contact connects to the first port of the first filament circuit 616. In the second set, the first electrical contact connects to the lower pin of the bi-pin 250 at an electrical contact 403 whereas the second electrical contact connects to the second port of the first filament circuit 616. Similarly, the integrated arc and shock prevention switch 710 in the second input module 700 at the other lamp base 760 comprises one actuation mechanism 740 and two sets of electrical contacts. In the first set, the first electrical contact connects to the upper pin of the bi-pin 350 at an electrical contact 405 whereas the second electrical contact connects to the first port of the second filament circuit 617. In the second set, the first electrical contact connects to the lower pin of the bi-pin 350 at an electrical contact 407 whereas the second electrical contact connects to the second port of the second filament circuit 617. The integrated arc and shock prevention switch 610 further comprises an arc prevention mechanism comprising two arc extinguishers 303 and 304, respectively associated with the two sets of electrical contacts in the integrated arc and shock prevention switch 610. Similarly, the integrated arc and shock prevention switch 710 further comprises an arc prevention mechanism comprising two arc extinguishers 305 and 306, associated with the two sets of electrical contacts in the integrated arc and shock prevention switch 710. Both integrated arc and shock prevention switches 610 and 710 have an on-state and an off-state, respectively referring to switch-on and switch-off conditions. The arc extinguishers 303 and 304 are linked together and controlled by the actuation mechanism 640. Similarly, the arc extinguishers 305 and 306 are linked together and controlled by the actuation mechanism 740. Both integrated arc and shock prevention switches 610 and 710 are normally "off" when the universal LLT lamp 800 is not installed in a lamp fixture whereas the actuation mechanisms 640 and 740 are protruded farthest out as shown in FIG. 1. In the off-state, the arc extinguishers 303, 304, 305, and 306 are inserted in between the associated set of electrical contacts not only to disconnect the electrical contacts but also to prevent any electrical arc from occurring. In the on-state, the actuation mechanisms 640 and 740 are respectively actuated (pressed in, twisted on, etc.) to push the arc extinguishers 303, 304, 305, and 306 out of the associated electrical contact area, actuating the integrated arc and shock prevention switches 610 and 710 and turning on the connection between the AC mains or the electronic ballast and the DBA LED driving circuit 100.

Figure 2:
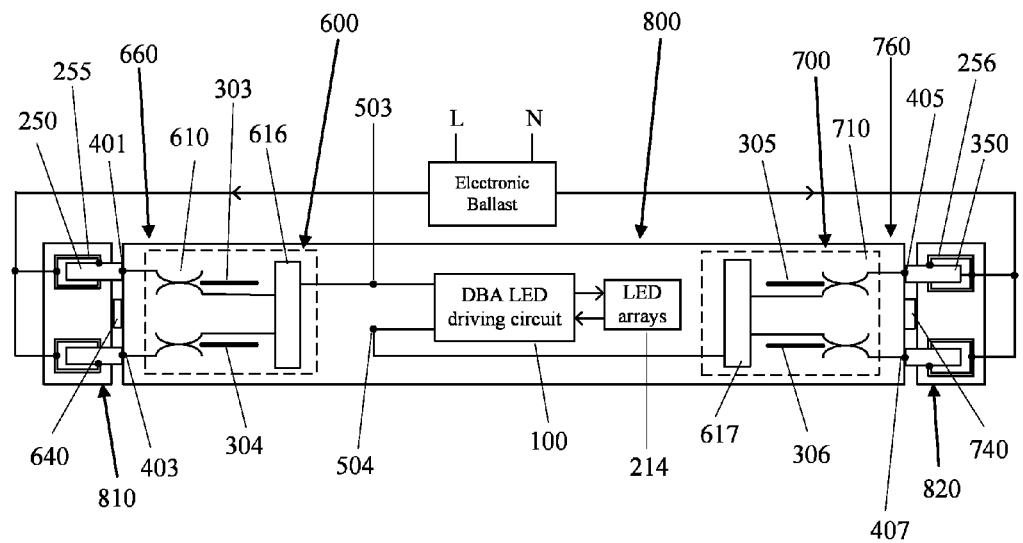
FIG. 2 is a block diagram of a universal LLT lamp installed in lamp fixture sockets connected with an instant-start electronic ballast, in which integrated arc and shock prevention switches are used according to the present disclosure.
Figure 3:
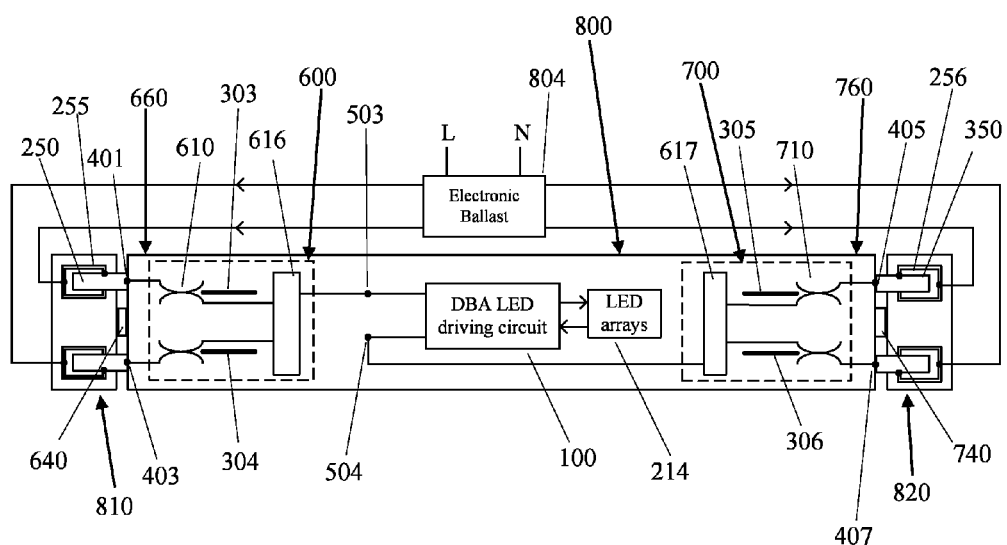
FIG. 3 is a block diagram of a universal LLT lamp installed in lamp fixture sockets connected with a rapid-start electronic ballast, in which integrated arc and shock prevention switches are used according to the present disclosure.

FIGS. 2 and 3 are block diagrams of a universal LLT lamp installed in fixture sockets respectively connected to an instant-start and a rapid-start electronic ballasts, in which the integrated arc and shock prevention switches are used according to the present disclosure. When the universal LLT lamp 800 is installed in the fixture sockets 255 and 256 shown in FIGS. 2 and 3, the actuation mechanisms 640 and 740 respectively push the arc extinguishers 303, 304, 305, and 306 away from the associated electrical contact area, resulting in connections between the AC mains or the electronic ballast and the DBA LED driving circuit 100. When someone tries to install the universal LLT lamp 800 that can be operated with the AC mains or the electronic ballast in the double-ended fixture wired as an AC mains-ready or electronic ballast compatible configurations as in FIG. 2 or 3, she or he needs to first insert, for example, the lamp base 660 to the fixture lamp holder 810. The actuation mechanism 640 is actuated to move the arc extinguishers 303 and 304, turning on both sets of electrical contacts in the integrated arc and shock prevention switch 610. The first filament circuit 616 provides an electrical path to connect the integrated arc and shock prevention switch 610 to the DBA LED driving circuit 100. Because the lamp base 760 has not yet been installed into the fixture lamp holder 820, no power is delivered to the DBA LED driving circuit 100 and the LED arrays 214. Although an electric current that flows into the DBA LED driving circuit 100 via the input/output port 503 and returns to the input/output port 504, continuously flowing into the second filament circuit 617, is blocked by the arc extinguishers 305 and 306 inserted in both sets of electrical contacts in the integrated arc and shock prevention switch 710, all the above mentioned electrical contacts and the input/output ports are live. Because the actuation mechanism 740 is not actuated at this time, the integrated arc and shock prevention switch 710 remains "off", disconnecting any electric current flow to the exposed bi-pin 350, and thus no leakage current can possibly flow out—no electric shock hazard. When the person who does the installation further inserts the lamp base 760 into the lamp holder 820, the actuation mechanism 740 is actuated, which moves the arc extinguishers 305 and 306 out of place and turns on the integrated arc and shock prevention switch 710, thus connecting the bi-pin 350 to the second filament circuit 617. The AC voltage from the AC mains or the electronic ballast thus appears between the input/output ports 503 and 504 of the DBA LED driving circuit 100, and the power is delivered to the DBA LED driving circuit 100 and the LED arrays 214.

FIG. 3 is a block diagram of a universal LLT lamp operable with a rapid-start electronic ballast according to the present disclosure. In general, a rapid-start electronic ballast has two pairs of wires connecting to a conventional fluorescent tube fixture to operate a fluorescent tube. Each pair of wires has two wires with the same color. In FIG. 3, the first and the second pairs of wires from the rapid-start electronic ballast 804 respectively connect to the electrical sockets 255 and 256 in the fixture lamp holders 810 and 820. The universal LLT lamp 800 is the same as the one in FIG. 2, with the filament circuits 616 and 617 in the respective input modules 600 and 700 on each end of the universal LLT lamp 800. The two filament circuits 616 and 617 are used to mimic two filaments originally used in a fluorescent tube to operate with an electronic ballast in illumination startup. In some rapid-start electronic ballasts, an internal circuit will check to see if such filaments exist to further proceed with a high voltage across the two pairs of the wires. Without the filament circuits 616 and 617 adopted, the universal LLT lamp 800 may fail to operate with the rapid-start electronic ballast. Each filament circuit comprises at least one resistor with a resistance so small that its voltage drop and power consumption can be neglected. As in FIG. 3, an electric current may leak out to an exposed bi-pin through the DBA LED driving circuit 100 when a high voltage from the rapid-start electronic ballast 804 applies to the bi-pin already installed in the fixture, creating an electric shock hazard if no integrated arc and shock prevention switches 610 and 710 are in place.

At least one of the shock prevention switches 610 and 710 may be of a contact type, wherein the at least one of the shock prevention switches is a snap switch, a push-button switch, a micro switch, a twist-on switch, or a rotary switch. At least one of the shock prevention switches 610 and 710 may be of a non-contact type, wherein the at least one of the shock prevention switches is electro-mechanical, electromagnetic, optical, electro-optic, fiber-optic, infrared, or wireless based. At least one of the shock prevention switches 610 and 710 may be of a sensing type having a proximity control with a sensing range up to approximately 8 mm.

As mentioned in Background, a conventional shock prevention switch has an inherent issue related to electric arc when operating with an electronic ballast. Unlike an AC voltage 120 or 277 V/50~60 Hz from the AC mains, an output AC voltage and a current from an electronic ballast present a negative resistance characteristic. The feature that originally supports fluorescent tube to function properly becomes extremely detrimental to the conventional shock prevention switch in applications that support an electronic ballast due to electric arc occurring between two electrical contacts that have a high electrical potential difference with a high frequency, such as 600 V/50 kHz. Once a consumer fails to follow installation instructions to install or uninstall the universal LLT lamp such that one of two ends of the universal LLT lamp is installed in a fixture socket connected to a powered electronic ballast, and the other end is tweaked to connect to or disconnect from the associated socket, an internal arcing may occur between the electrical contacts in the associated shock prevention switch. The arcing even in a short period such as several seconds can generate high heat, burning and melting electrical contacts and neighboring plastic enclosures, creating a fire hazard. When the lamp base 660 has been already installed in the fixture lamp holder 810 that is wired for electronic ballast applications as in FIG. 2 or 3, and when the person who does the installation tries to further insert the lamp base 760 into the lamp holder 820 by tweaking the lamp base 760 such that the bi-pin 350 connects to the powered socket 256 but the actuation mechanism 740 is not yet actuated, in this case, the arc extinguishers 305 and 306 still remain in between each set of the electrical contacts, not only disconnecting the electrical contacts but also preventing an arc to be generated. If a conventional shock prevention switch is used instead for the same circumstance, a strong current will jump across an air gap between each set of electrical contacts, resulting in luminous discharge of current, creating high heat and a fire hazard. The situation worsens when someone tries to tweak to remove one end of the universal LLT lamp 800, for example, the lamp base 760 from the fixture lamp holder 820 with the lamp base 660 still in the fixture lamp holder 810 while the bi-pin 350 still connects to the powered socket 256 and the actuation mechanism 740 is about to be de-actuated but not yet de-actuated. In this case, if a conventional shock prevention switch is used, arcing is much easier to start in the air gap area immediately when the electrical contacts disconnect and to continue to weld the electrical contacts and melt a plastic enclosure due to high heat generated in arcing. This is like arc welding widely used in the welding industry. Such a severe fire hazard, however, can be avoided if an integrated arc and shock prevention switch is used. As in FIGS. 2 and 3, once the actuation mechanism 740 is de-actuated, the arc extinguishers 305 and 306 rapidly snap into the contact area between each set of the electrical contacts in the integrated arc and shock prevention switch 710, thus no electrical arcs being possibly generated.

Figure 4:
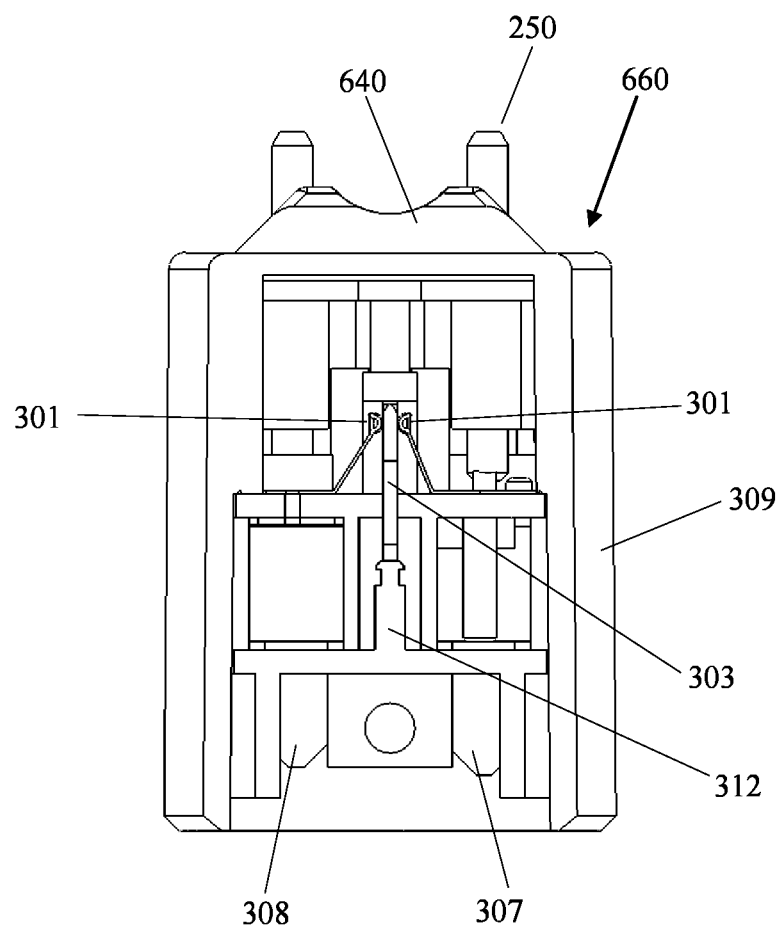
FIG. 4 is one of cross-section views of a lamp base comprising an integrated arc and shock prevention switch in normally off-state with both pins of a bi-pin facing the viewer according to the present disclosure.
Figure 5:
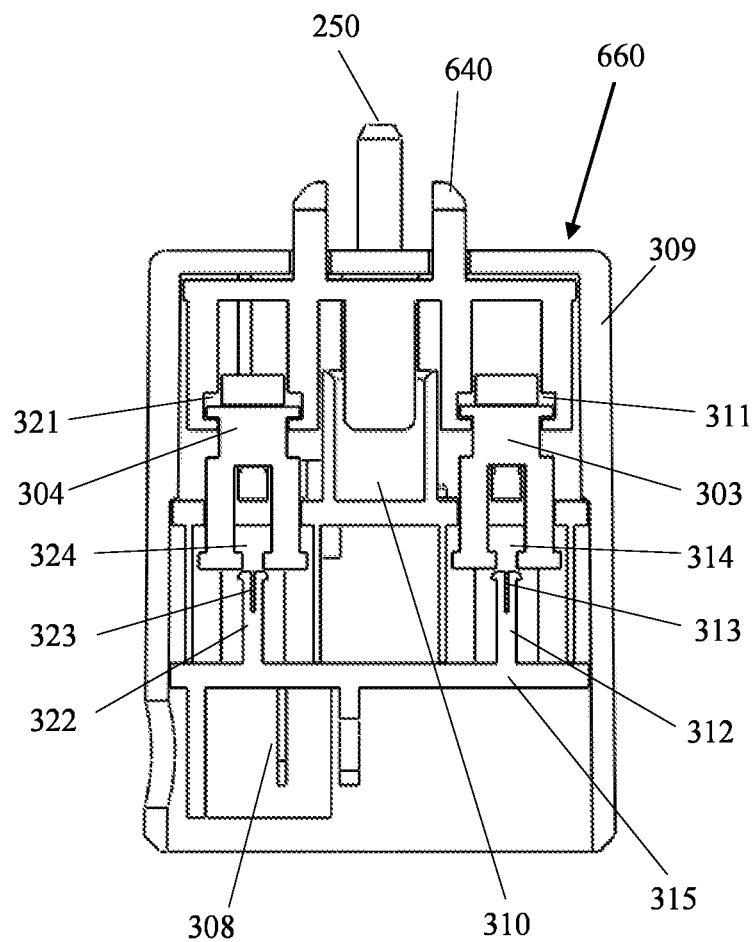
FIG. 5 is one of cross-section views of a lamp base comprising an integrated arc and shock prevention switch in normally off-state with a single pin of a bi-pin facing the viewer according to the present disclosure.
Figure 6:
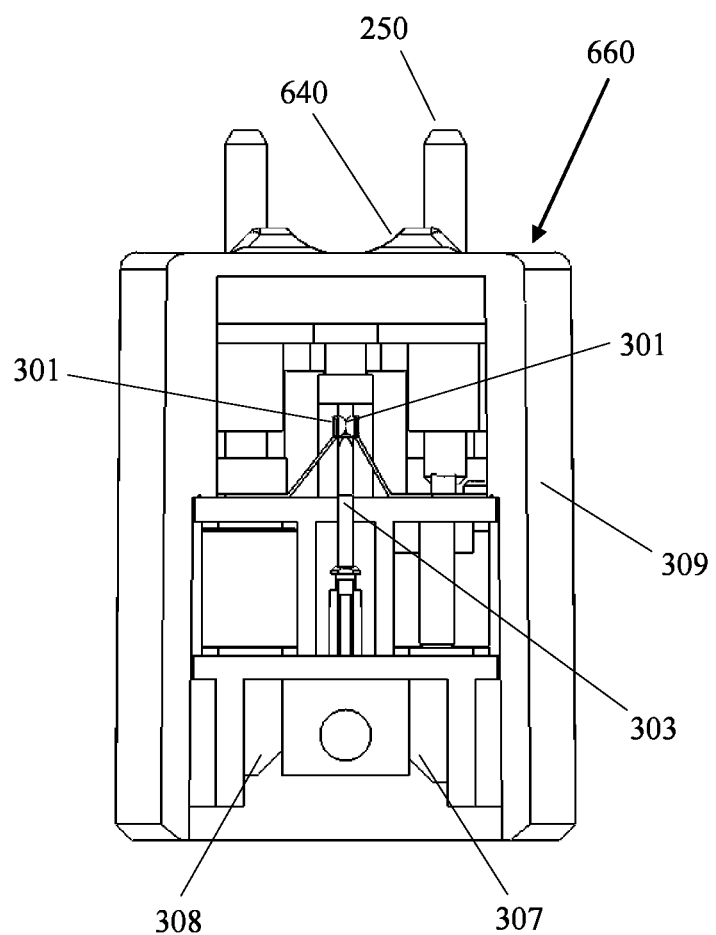
FIG. 6 is one of cross-section views of a lamp base comprising an integrated arc and shock prevention switch in on-state with both pins of a bi-pin facing the viewer according to the present disclosure.
Figure 7:
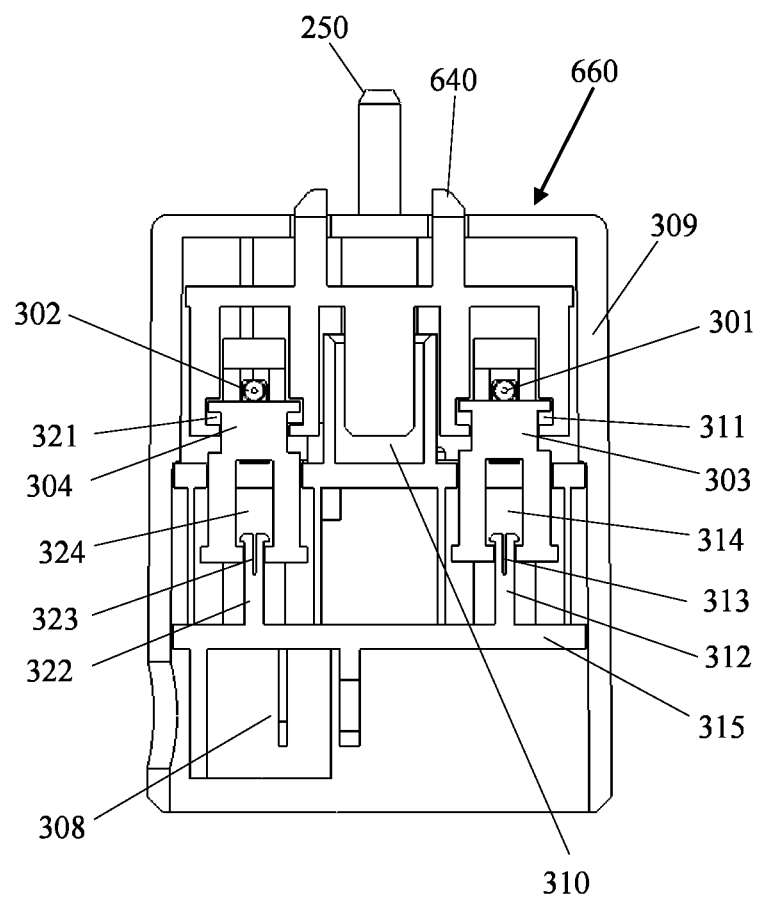
FIG. 7 is one of cross-section views of a lamp base comprising an integrated arc and shock prevention switch in on-state with a single pin of a bi-pin facing the viewer according to the present disclosure.

FIG. 4 is one of cross-section views of a lamp base comprising an integrated arc and shock prevention switch in normally off-state with both pins of a bi-pin facing the viewer according to the present disclosure. FIG. 5 is another cross-section view of the lamp base in the same off-state as in FIG. 4 with a single pin of the bi-pin facing the viewer. FIG. 6 is one of cross-section views of a lamp base comprising an integrated arc and shock prevention switch in on-state with both pins of a bi-pin facing the viewer according to the present disclosure. FIG. 7 is another cross-section view of the lamp base in the same on-state as in FIG. 6 with a single pin of the bi-pin facing the viewer according to the present disclosure. Referring to FIGS. 4-7, a lamp base 660 comprises a pair of bi-pin 250, a switch actuation mechanism 640, two pairs of electrical contacts 301 and 302 (in FIG. 7), two arc extinguishers 303 and 304 (in FIG. 5) respectively associated with the electrical contacts 301 and 302, two electrical terminals 307 and 308 (in FIG. 4), and a lamp base enclosure 309 used to accommodate all the components. The two pairs of electrical contacts 301 and 302 are made of copper or other good conductors with good ductility to ensure mechanical repeatability of switch on and off. Referring to FIGS. 4 and 5, when the switch actuation mechanism 640 is not actuated, the arc extinguishers 303 and 304, made of ceramic or other good insulating materials, are inserted in between two electrical contacts in the two pairs of electrical contacts 301 and 302 to prevent any possible arc that can occur if air gaps rather than the arc extinguishers 303 and 304 are in place, as in a conventional shock prevention switch. The switch actuation mechanism 640 remains stretching farthest out when no external force is exerted to compress a spring (not shown) adopted inside a compartment 310. In this case, power from the bi-pin 250 does not couple to the two electrical terminals 307 and 308 which connect to the first and the second ports of the filament circuit 616, thus no energy is delivered to the DBA LED driving circuit 100 to operate LED arrays 214 (in FIGS. 1-3). The integrated arc and shock prevention switch of each of the lamp bases may comprise more than one switch actuation mechanism having a front portion protruding outwards, wherein when the front portion of the switch actuation mechanism is pressed in or twisted on by installing the bi-pin of the lamp base in a lamp socket, the electrical contacts of each of the two sets of electrical contacts are electrically connected to actuate the integrated arc and shock prevention switch. The front portion of the switch actuation mechanism may have a preferred concave shape to reduce the likelihood of accidental engagement by an installer during relamping from an energized lamp fixture, creating an electric shock hazard.

In addition to the arc extinguishers, the arc prevention mechanism further comprises a control mechanism used to disengage electrical contacts, preventing any arc from recurring in the shock prevention switch. The control mechanism comprises a pair of cylindrical rods 312 and 322 (in FIG. 5), made of a plastic, extruded on a substrate 315; a pair of grooves 313 and 323 on the cylindrical rods 312 and 322, and rod holders 314 and 324 on the arc extinguishers 303 and 304. Referring to FIGS. 6 and 7, when the switch actuation mechanism 640 is pushed by an external force exerted to compress the spring in the compartment 310, the arc extinguishers 303 and 304 move out of electrical contact area. Two sets of electrical contacts 301 and 302 are so designed and built that they can rapidly make their own electrical connections as soon as the arc extinguishers 303 and 304 are out of electrical contact area. Referring to FIGS. 5 and 7, when the arc extinguishers 303 and 304 move away from the electrical contact area, the external force also exerts to respectively push the cylindrical rods 312 and 322 into the rod holders 314 and 324. The design of the grooves 313 and 323 on the cylindrical rods 312 and 322 helps the insertion. Once the external force is released, a restoring force of the spring installed in the compartment 310 exerts to pull the arc extinguishers 303 and 304 away from the cylindrical rods 312 and 322. The switch actuation mechanism 640 further comprises a pair of cavities 311 and 321 (in FIGS. 5 and 7). When the arc extinguishers 303 and 304 are pulled away from the cylindrical rods 312 and 322, the upper ends of the arc extinguishers 303 and 304 will immediately touch the upper ends of the cavities 311 and 321 so that the arc extinguishers 303 and 304 can snap in between the electrical contacts 301 and 302, instantly disconnecting connections and preventing arc from recurring. Although in FIGS. 4-7 only the lamp base 660 is described in details, the lamp base 760 has the same structure as the lamp base 660.

Whereas preferred embodiments of the present disclosure have been shown and described, it will be realized that alterations, modifications, and improvements may be made thereto without departing from the scope of the following claims. Another integrated arc and shock prevention switch in an LED-based lamp using various kinds of combinations to accomplish the same or different objectives could be easily adapted for use from the present disclosure. Accordingly, the foregoing descriptions and attached drawings are by way of example only, and are not intended to be limiting.

What is claimed is:

1. A linear light-emitting diode (LED) tube lamp, comprising:
 a housing having two ends;
 a light-emitting diode printed circuit board (LED PCB), the LED PCB comprising one or more LED arrays disposed thereon;
 two lamp bases each connected to a respective end of the two ends of the housing, each lamp base comprising a bi-pin each with two pins protruding outwards, each lamp base further comprising an input module comprising a shock prevention switch and an arc prevention mechanism; and
 an LED driving circuit configured to convert an input alternating current (AC) voltage from an external power supply into regulated direct current (DC) voltage and current provided to power the one or more LED arrays;
 wherein, for each lamp base, when the respective shock prevention switch is off, the arc prevention mechanism functions to decouple the input AC voltage from the linear LED tube lamp;
 wherein, for each lamp base, when the bi-pin is installed in a lamp socket, the arc prevention mechanism functions to couple the input AC voltage to the linear LED tube lamp; and
 wherein the arc prevention mechanism comprises at least one arc extinguisher configured to control turning on and off of the shock prevention switch.

2. The linear LED tube lamp of claim 1, wherein the shock prevention switch of each of the lamp bases comprises:

two sets of electrical contacts, each set having at least two electrical contacts, with one electrically connected to one of the two pins of the bi-pin and another coupled to the LED driving circuit; and at least one switch actuation mechanism having a front portion protruding outwards, wherein, when the front portion of the switch actuation mechanism is pressed in or twisted on as the bi-pin of the lamp base is installed in a lamp socket, the electrical contacts of each of the two sets of electrical contacts are electrically connected to actuate the shock prevention switch.

3. The linear LED tube lamp of claim 2, wherein the front portion of the switch actuation mechanism has a concave shape.

4. The linear LED tube lamp of claim 1, wherein the at least one arc extinguisher is configured to prevent an arc from occurring in the shock prevention switch.

5. The linear LED tube lamp of claim 1, wherein the arc prevention mechanism further comprises a control mechanism configured to disengage the electrical contacts to prevent an arc from recurring in the shock prevention switch.

6. The linear LED tube lamp of claim 5, wherein the control mechanism comprises at least one cylindrical rod, at least one rod holder, at least one groove on the at least one cylindrical rod, and at least one cavity configured to accommodate the at least one cylindrical rod.

7. The linear LED tube lamp of claim 1, wherein at least one of the shock prevention switches is of a contact type.

8. The linear LED tube lamp of claim 7, wherein the at least one of the shock prevention switches is a snap switch, a push-button switch, a micro switch, a twist-on switch, or a rotary switch.

9. The linear LED tube lamp of claim 1, wherein at least one of the shock prevention switches is of a non-contact type.

10. The linear LED tube lamp of claim 9, wherein the at least one of the shock prevention switches is electro-mechanical, electromagnetic, optical, electro-optic, fiber-optic, infrared, or wireless based.

11. The linear LED tube lamp of claim 9, wherein the at least one of the shock prevention switches is of a sensing type having a proximity control.

12. The linear LED tube lamp of claim 11, wherein the proximity control of the at least one of the shock prevention switches has a sensing range up to approximately 8 mm.

13. The linear LED tube lamp of claim 1, wherein at least one of the input modules further comprises a filament circuit.

* * * * *